United States Patent
Martins Loureiro et al.

(10) Patent No.: US 11,798,154 B2
(45) Date of Patent: Oct. 24, 2023

(54) CIRCULAR KNITTING MACHINE AND RESPECTIVE METHOD TO CONTROL TEXTILE QUALITY BY USE OF DIGITAL CAMERA

(71) Applicant: SMARTEX EUROPE, UNIPESSOAL LDA., Oporto (PT)

(72) Inventors: Gilberto Martins Loureiro, Galegos (PT); António Jorge Mendes Da Rocha, Vila Nova de Gaia (PT)

(73) Assignee: SMARTEX EUROPE, UNIPESSOAL LDA., Oporto (PT)

( * ) Notice: Subject to any disclaimer, the term of this patent is extended or adjusted under 35 U.S.C. 154(b) by 0 days.

(21) Appl. No.: 17/285,706

(22) PCT Filed: Apr. 5, 2019

(86) PCT No.: PCT/IB2019/052806
§ 371 (c)(1),
(2) Date: Apr. 15, 2021

(87) PCT Pub. No.: WO2020/079493
PCT Pub. Date: Apr. 23, 2020

(65) Prior Publication Data
US 2022/0005182 A1    Jan. 6, 2022

(30) Foreign Application Priority Data

Oct. 15, 2018 (PT) .......................... 115081
Oct. 19, 2018 (EP) ..................... 18201631

(51) Int. Cl.
*G06T 7/00*    (2017.01)
*D04B 15/88*    (2006.01)
(Continued)

(52) U.S. Cl.
CPC ............ *G06T 7/0004* (2013.01); *D04B 15/88* (2013.01); *D04B 35/20* (2013.01); *G06T 1/0014* (2013.01);
(Continued)

(58) Field of Classification Search
CPC combination set(s) only.
See application file for complete search history.

(56) References Cited

U.S. PATENT DOCUMENTS 3,345,835 A * 10/1967 Nickell ..................... D03J 1/00
                                                                        66/166
3,496,739 A    2/1970 Linden et al.
(Continued)

FOREIGN PATENT DOCUMENTS

| CN | 105044121 A | 11/2015 |
| CN | 206570496 U | 10/2017 |

(Continued)

*Primary Examiner* — Jayanti K Patel
*Assistant Examiner* — Christopher Kingsbury Glover
(74) *Attorney, Agent, or Firm* — Leason Ellis LLP

(57) ABSTRACT

A circular knitting machine, a method for controlling textile fabric defects, and a method for retrofitting a circular knitting machine are provided. The circular knitting machine includes a fixed support structure, a rotational support structure, and a system for controlling textile fabric defects. The system includes a digital camera for capturing digital images of knitted textile fabric, a data processor for processing the captured digital images, a camera support structure for holding the camera, and a lighting system to illuminate the knitted textile fabric from the camera side for capture by the digital camera. The camera support structure is fixed to the rotational structure.

18 Claims, 10 Drawing Sheets

(51) Int. Cl.
    *D04B 35/20*     (2006.01)
    *G06T 1/00*     (2006.01)
    *H04N 5/225*     (2006.01)
    *H04N 23/54*     (2023.01)
    *H04N 23/56*     (2023.01)

(52) U.S. Cl.
    CPC ............. *H04N 23/54* (2023.01); *H04N 23/56* (2023.01); *G06T 2207/10048* (2013.01); *G06T 2207/30124* (2013.01)

(56) References Cited

U.S. PATENT DOCUMENTS

| | | | |
|---|---|---|---|
| 4,249,081 A | | 2/1981 | Cole et al. |
| 4,748,334 A | * | 5/1988 | Kobayashi ......... G01N 21/8983 66/166 |
| 4,953,400 A | * | 9/1990 | Bossuyt ................ D04B 35/10 356/238.1 |
| 4,984,896 A | | 1/1991 | Flamig |
| 5,283,623 A | * | 2/1994 | Muhlberg ......... G01N 21/8983 250/559.47 |
| 6,219,136 B1 | * | 4/2001 | Kuo ................... G01N 21/8983 66/157 |

FOREIGN PATENT DOCUMENTS

| | | |
|---|---|---|
| CN | 206680676 U | 11/2017 |
| CN | 113166987 A | 7/2021 |
| DE | 1174936 B | 7/1964 |
| GB | 2181834 A | 4/1987 |
| JP | H0327156 A | 2/1991 |
| WO | WO 1992/008967 A1 | 5/1992 |

* cited by examiner

CIRCULAR KNITTING MACHINE AND RESPECTIVE METHOD TO CONTROL TEXTILE QUALITY BY USE OF DIGITAL CAMERA

CROSS-REFERENCE TO RELATED APPLICATIONS

This application is a U.S. National Stage Application under 35 U.S.C. § 371 of International Patent Application No. PCT/IB2019/052806, filed Apr. 5, 2019, which claims priority to European Patent Application No. 18201631.1, filed Oct. 19, 2018, and Portugal Patent Application No. 115081, filed Oct. 15, 2018, the contents of which are each hereby incorporated by reference in their respective entireties.

TECHNICAL FIELD

The present disclosure relates to a detector system and method for controlling textile fabric defects, in a circular knitting machine, used for weft knitting, and more particularly to a device employed in manufacturing operations to detect irregularities in knitted fabrics.

BACKGROUND

Circular (or Weft) knitting machines are commonly used for industrial fabrics production. It is possible to make several textile structures with these machines, as well as combinations of yarn composition, and physical properties.

These machines are prepared to produce 24 hours per day, 365 days per year, and they are usually monitored by workers who are responsible to maintain the machines producing without stopping. There are several reasons for stopping a machine such as finished roll, open doors, finished order, and others. One of the main reasons for a stopped machine is the existence of hundreds of sensors over all the machine's structure. These sensors prevent broken yarns, broken or defective needles, broken elastane yarns, and other possible sources of production faults.

Each sensor should stop the machine in case of failure of standard conditions. Then, the worker is responsible to identify which sensor has stopped (by lighting system for example), fix the associated problem, and turn on the production again.

There are several limitations during this production process, mainly regarding quality assurance and defect detection. One of the main problems in this industry is the detection of production faults after the fabrics are produced. There are few sensors that detect defects directly on fabrics, and those sensors only detect few fault types (such as holes or oil spots).

Once a flaw starts being produced, it will be replicated over all roll length until human intervention happens. It can only be stopped when human intervention occurs. Defects are usually detected by workers that check machines periodically, or alternatively, after production checking, on textiles inspection machines.

There are several types of fabrics defects, such as: needle defect (complete, such as needle does not pull the yarn); contamination defect by oil (oil spots caused by common oil leaks); needle defect (incomplete, such as needle incorrectly pulls the yarn); needle and sinker defect (uniformity caused by incorrect combination between sinker and needle, leading to non-uniformities); continuous elastane defect (commonly called Lycra defect, or spandex defect—it is barely detected by humans during production, only several phases after knitting); dashed elastane defect (same structure flaw as continuous elastane defect, but dashed, more rare and less visible—it is barely detected by humans during production, only several phases after knitting); contamination by other fibres (when fibres from other sources imprudently get in production, causing spots with different material); contamination by other colours (when fibres from other sources imprudently get in the production, causing spots with different colours); unwanted hairiness; yarn non-uniform width; non-uniform distance between wales (columns) or courses (rows); and non-uniformities on the production fabrics.

Nowadays, typically only the first two said defects are automatically detected by commercial sensors (Memminger™ devices or alternatives). The remaining faults are detected by workers during the production (if visible, directly on the knitting machine) or after production (on inspection machines).

Unfortunately, the detected defects on inspection machines do not avoid defective production, since entire rolls were already produced. However, it is the most effective way to prevent defects so far.

As well as in other industries (automotive, industrial production of tires, plastics, etc), machine vision systems can be used to inspect, detect flaws, categorize quality and act if necessary.

Circular (or weft) knitting machines are composed by two main structures: one that is fixed and other that is rotating. The fixed part may have hundreds of sensors that detect broken yarns or broken elastane (Lycra), that prevent (not detect) defective fabrics production (not 100% efficient). There may be also a common system that detects broken needles (or defective needles) by laser reflection or inductive sensing needle counter, preventing (not detecting) needle defects with a considerable efficiency (not 100%).

Regarding the rotative part, it is where the produced fabric is placed and stored until the roll is ready to leave. The descending fabrics in the rotative part are possible to be seen by the operator, in case that he is nearby for monitoring (not 100% efficient).

It was found only one device that detects production flaws (not preventing, only detecting) after the fabrics have been produced. It is based on (infrared) light reflection on textile surface, detecting reflection failures caused by hole or dark oil spots and stopping the machine (fabric defect commercial sensor by Memminger™ under the KNIT SCAN™ as specified in U.S. Pat. No. 5,283,623A).

This system is not capable of distinguishing between detected flaws, do not register information about defects (or number of detections) and is not prepared to detect several other defects (does not detect the other flaws apart from the first two).

Current systems are normally not prepared to be integrated into inspection machinery or dyeing machinery.

Current systems are not prepared to detect the following defects: continuous Lycra flaws; dashed Lycra flaws; contaminations (especially color points, different materials, transparent oil points, not excluding other types of undesired contamination); irregular distance between wales; Irregular distance between rows; and nonuniformities on texture, shape, and topography.

Current systems are also limited to alert/stop production instantaneously after detection. Additionally, the first two mentioned defects are not possible to be detected by human eye during production. Those are usually detected after production.

Human intervention is necessary in most of the prior art detection processes. It is normally necessary to have an operator physically checking production in the inspection machines.

These facts are disclosed in order to illustrate the technical problem addressed by the present disclosure.

GENERAL DESCRIPTION

The present disclosure aims to detect all mentioned defects, act properly after detection (by stopping the machine and/or send an alert), as well as register their occurrences for quality assurance and statistics and for real-time monitoring. The disclosed system is used preferably for detection (not prevention), but it can be used to prevent flaws by using the acquired data to infer about potential future defects. Stopping the machine also prevents continuous defective production. This system can be directly integrated into the knitting machine, as well as in other phases such as inspection machinery.

This disclosure is a system for controlling operation of a circular knitting machine comprising a device (hardware) and a method (operation) as well as software (for analysis). It comprises 2D signal acquisition (images, videos, or others), in certain conditions (its position, illumination, optical systems) such as it is possible to capture such data and detect non-uniformities/defects in textile fabrics. This device is preferably to be placed inside the knitting machine, preventing defective production and autonomous monitorization in real time (stopping the machine, send an alert, other actuators could be integrated). The entire system is preferably to be installed on the machine's rotative part, becoming the device itself rotative in relation to the exterior.

One of the main advantages is that it allows to automatically detect flaws on knitted fabrics that are not possible to detect with current technologies. Some specific defects (such as dashed Lycra defect) are barely seen by humans. The present disclosure detects all defects (including dashed Lycra) without human intervention. Other advantages are: (1) easy to install (plug and play) on circular knitting machines, inspection machines, dyeing house machinery, and others. The structure that supports each element must be different depending on the place where the present system is installed; (2) it is prepared to be wireless connected. It allows being controlled remotely as well as provide real-time production monitoring; and (3) it saves all acquired data and uses it to find patterns or production inefficiencies. Saved data could be used for statistics, or even to give guarantees to clients about production inspected and quality certificated.

The present disclosure can detect all mentioned flaws, as well as others already detected by current systems. In addition, current systems are not capable of distinguish between different defects, they simply stop production. The system stops the machine (or send an alert) and save information about which flaw was detected, the hour of detection, conditions, repeatable flaws, and also save all images taken for future analysis or statistics.

The present disclosure is prepared to be integrated into a plethora of positions and conditions. Once it is installed, it is important that inspection conditions keep constant along time. The disclosed system and method were designed to learn patterns and alert when those patterns are compromised using machine-learning methods.

Despite that, the presented system is capable of inferring about production quality by texture and/or variance (and/or differential) analysis. It allows registering the percentage of changes and non-uniformities that textile materials present. Textile materials are not perfectly uniform, for that reason, it is important to adjust quality parameters. Nowadays, humans are responsible to infer about production quality and uniformity parameters. This method is susceptible to several human errors and opinions that are not converted into real quantitative and logged data.

The presented system offers the possibility of monitoring in real time and remotely. It is especially useful because of the hostile industrial environment which is hard for the worker to check production. It is also useful because the human quality control can still happen remotely on several machines simultaneously.

It is disclosed a circular knitting machine comprising a fixed support structure, a rotational support structure, and a system for controlling textile fabric defects, said circular knitting machine comprising: a roller for flattening a circular knitted web into said textile fabric, and a cylinder arranged on a lower part of said rotational structure for rolling-in the flattened textile fabric; said system comprising: a digital camera for capturing digital images of the knitted textile fabric, a data processor for processing the captured digital images, a camera support structure for holding the camera, wherein the camera support structure is fixed to the rotational structure.

In an embodiment, said camera support structure is arranged such that the digital camera captures digital images of the flattened textile fabric.

In an embodiment, said digital camera is a one-dimensional camera or 2D camera.

In an embodiment, said camera support structure comprising a front light for illuminating the knitted textile fabric, from the camera side.

In an embodiment, said circular knitting machine comprise an additional support structure and a back light arranged on said additional support structure, for illuminating the knitted textile fabric from a side opposite camera side and fixed to the rotational structure, wherein said back light comprises a light source for illuminating the knitted textile fabric, in particular the said light source being continuous.

In an embodiment, said circular knitting machine comprises: a front light arranged on said camera support structure to illuminate the knitted textile fabric from the camera side for capture by the digital camera, an additional support structure and a back light arranged on said additional support structure to illuminate the knitted textile fabric from a side of the textile fabric opposite to the camera for capture by the digital camera, wherein the camera support structure and the additional support structure are fixed to the rotational structure.

In an embodiment, the camera is arranged to accommodate an optical device for enhancing resolution of the image captured from knitted textile.

In an embodiment, the optical device comprises one or more optical lenses arranged for signal acquisition.

It is also disclosed a method for obtaining a retrofitted circular knitting machine having a fixed support structure, a rotational support structure, with a system for controlling textile fabric defects, the method comprising: fitting said circular knitting machine with the system described in any of the previous claims to obtain a circular knitting machine according to any of the described embodiments.

In an embodiment, the method for controlling textile fabric defects of a circular knitting machine comprises capturing digital images of the knitted textile fabric, and using the data processor for processing the captured digital images for detecting knitted textile fabric defects.

In an embodiment, the capturing digital images of the knitted textile fabric is made between the roller and the cylinder with the digital camera.

In an embodiment, the capturing digital images of the knitted textile fabric is made in rotational synchronisation between the camera and the knitted textile fabric.

In an embodiment, the method comprises using a front light to illuminate the knitted textile fabric from the camera side for capture by the digital camera, and using a back light to illuminate the knitted textile fabric from the side opposite to the camera for capture by the digital camera.

It is also disclosed a system for controlling textile fabric defects in a circular knitting machine having a fixed support structure, a rotational support structure, said system comprising: a digital camera for capturing digital images of the knitted textile fabric, a data processor for processing the captured digital images, a frontal support structure for holding the camera, a back-support structure, a front light arranged on said frontal support structure to illuminate the knitted textile fabric from the camera side for capture by the digital camera, and a back light arranged on said back support structure to illuminate the knitted textile fabric, from a side of the textile fabric opposite to the camera, for capture by the digital camera; wherein the frontal and back support structures fixed to the rotational structure.

The textile fabric is a web textile fabric, that webs in said circular knitting machine between physical elements and supports like rollers, splitters, cutters or knitters.

In an embodiment, the system for controlling textile fabric defects in a circular knitting machine comprises a roller for flattening the circular knitted web and a cylinder arranged on a lower part of said rotational structure for rolling-in the flattened knitted web, wherein said frontal support structure and said back support structure are arranged such that the digital camera captures digital images of the flattened knitted textile fabric.

In an embodiment, the system for controlling textile fabric defects in a circular knitting machine comprises a roller for flattening the circular knitted web and a cylinder arranged on a lower part of said rotational structure for rolling-in the flattened knitted web, wherein said frontal support structure and back support structure are on an upper part of said rotational structure and are arranged such that the digital camera captures digital images of the knitted textile fabric before being flattened.

In an embodiment, the data processor is arranged for: processing the captured digital images for detecting textile defects in real time, and stopping the motion of the circular knitting machine for preventing more defects.

In an embodiment, the front light comprises a tangential angle illuminator for illuminating the web for the digital camera.

In an embodiment, the front light comprises the second source of light arranged in parallel the tangential angle illuminator for illuminating the web for the digital camera.

In an embodiment, the back light comprises singular or continuous light sources placed for reflecting the light on the textile fabrics.

In an embodiment, the camera is arranged to accommodate an optical device for enhancing resolution of the image captured from knitted textile.

In an embodiment, the optical device comprises optical lenses arranged to be regulated for 2d or 1d signal acquisition.

In an embodiment, the optical lenses are chosen for predetermined distances for obtaining an imaging resolution of less than one millimetre.

In an embodiment, the front light and back light sources comprises light sources with different wavelengths such as infrared light, visible light, ultraviolet light, or combinations thereof, in particular one light source selected from the front light and the back light being an infrared light source.

It is also disclosed a circular knitting machine comprising the system according to any of the previous embodiments.

It is also disclosed a method for obtaining a retrofitted circular knitting machine having a fixed support structure, a rotational support structure, for controlling textile fabric defects, the method comprising: fitting said circular knitting machine with the system according to previous paragraphs.

In an embodiment, the method for controlling textile defects of a circular knitting machine having a fixed support structure on top, a rotational support structure, a roller for flattening the circular knitted textile fabric and a cylinder arranged on a lower part of said rotational structure for rolling-in the flattened knitted textile, said system comprising: a digital camera, a data processor, a frontal support structure for holding the camera, a back support structure, a front light arranged on said frontal support structure, and a back light arranged on said back support structure; wherein the frontal and back support structures are elongated and fixed to the rotational structure in parallel to the cylinder; the method comprising: capturing digital images of the flattened knitted textile between the roller and the cylinder with the digital camera, using the data processor for processing the captured digital images for detecting textile defects, using the front light to illuminate the flattened knitted web from the camera side for capture by the digital camera, and using the back light to illuminate the flattened knitted textile from the side opposite to the camera for capture by the digital camera.

In an embodiment, the method using the data processor for processing the captured digital images in real time for detecting textile defects, and stopping the motion of the circular knitting machine if a defect is detected suitable for preventing defective production.

BRIEF DESCRIPTION OF THE DRAWINGS

The following figures provide preferred embodiments for illustrating the disclosure and should not be seen as limiting the scope of disclosure.

DETAILED DESCRIPTION

Figure 1:
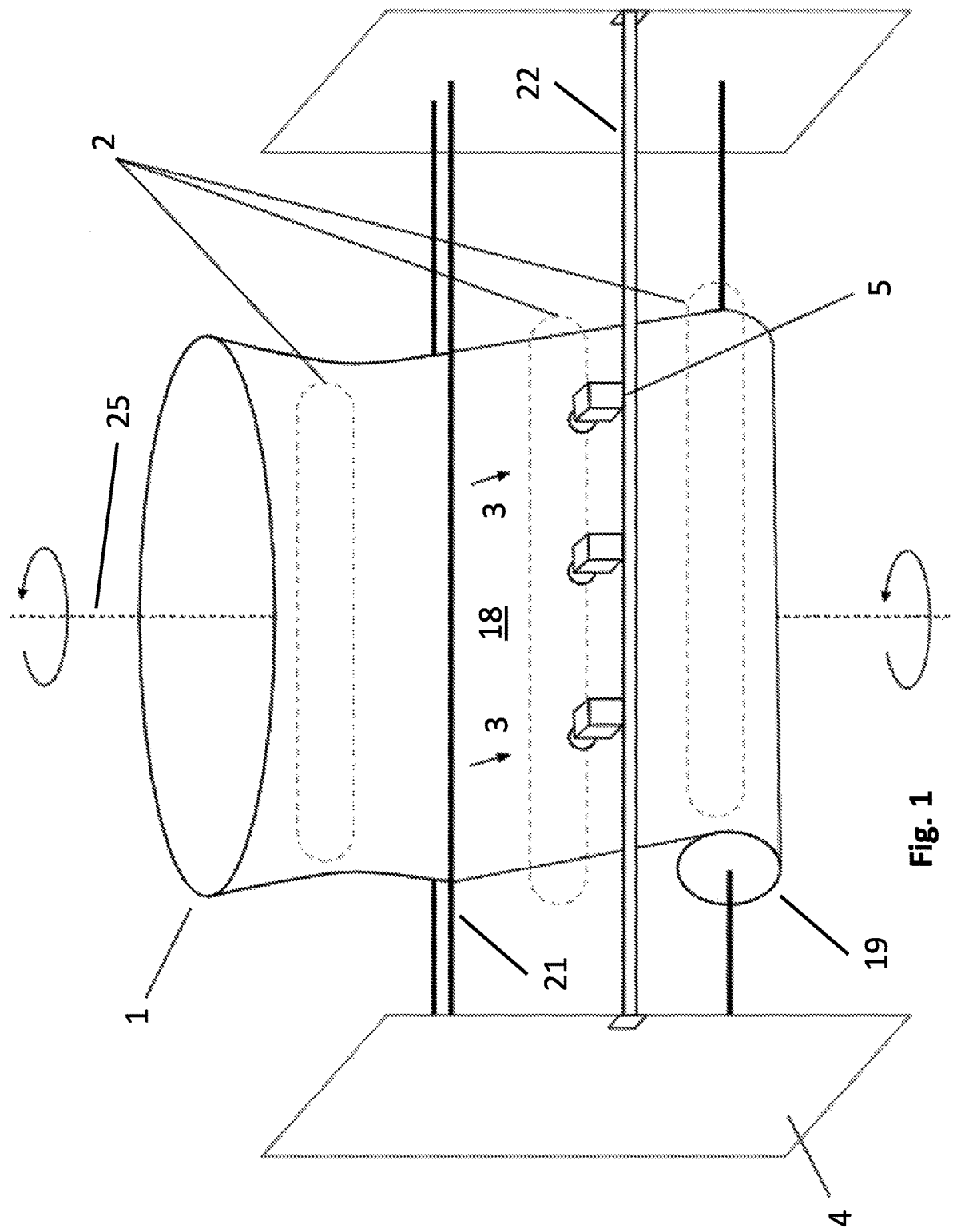
FIG. 1 is a schematic conceptual representation of an embodiment of a circular (or Weft) knitting machine having a system according to the disclosure fixed to lateral supports of the rotational part of the machine.

The system according to an embodiment of the present disclosure is typically comprised by:

Camera (such as camera 5, camera and lighting system 6, or camera 16, or alternative device to acquire a 2D or 1D signal from the textile surface, in this case images). It is the data acquisition system, should be preferably able to acquire images on industrial conditions such as moving textile (depending on defect types, it is convenient to use a camera sensor with sensitivity on infrared and/or ultraviolet light and/or visible light), should be suitable in size and convenient to plug in the disclosed structures.

Optical system: Depending on the position as well as the distance between camera and fabrics, it is preferable to have the best optical system to enhance image resolution. In a first approach, this system is preferably composed by lenses that are possible to be regulated for better 2d or 1d signal acquisition.

Light source: The lighting system (such as camera and lighting system 6, front light 23, or back light 24) is preferential but could be optional. Depending on surrounding conditions and sufficient background illumination, it is possible to use the disclosed system with no back or front light. This also means that front and back structures are also possible to be removed. So as an alternative, the disclosed system could be used with front light only (tangential or not), backlight only, or none of them. It could be individual light or continuous, placed on one or both sides of the textile, with light normally incident or low-angle light. Each position enhances different properties and flaws, as well as highlight the textile structure and texture. The intensity should preferably be adjusted to the setup, in order to maximize image resolution and quality. Different wavelengths such as infrared, visible, and other light wavelengths are also used to get different information about colour, texture, and material properties.

Processing unit: Hardware unit that receives the acquired data, processes it (using the disclosed software for 2d or 1d signal analysis) and acts depending on the result. It could communicate with the exterior.

Structure to hold components: The acquisition element and light sources should preferably be placed in specific positions, respecting distances, angles, and field of view. In order to guarantee such conditions, the present system is provided with a structural element that supports the other devices.

Computer server (optional): The disclosed system can preferably be communicating with the exterior, and there are several additional features that can be integrated by using external elements such as a server. One preferable feature is the real-time monitoring from phones or computers, where an app could show in real time the machine's production with images and quality reports. This system could be physically outside the detection device, or not.

This disclosure aims to determine if there is a defective product or not. Despite that, it is preferably possible to distinguish between all different defects and save information for reporting and statistics.

The variables that affect this system are:

Acquisition system: 2d signal acquisition using a camera (such as camera 5, camera and lighting system 6, or camera 16) or alternative. It should preferably present a low time exposure (fast shutter) in order to take pictures in a hostile environment (features described previously);

Camera position (position, distance, and angle): The acquisition system must preferably be wisely placed in order to get more and complete information about the textile structure and properties. It could be placed on the fixed part (top of the machine) inspecting fabrics right next to the needles. It could also be installed on the bottom part of the machine (moving or not). In case the camera is fixed (not rotating), it should be prepared to capture images in synchrony with the machine movement. In case that it is placed on the moving part, the camera is installed as FIG. 4 suggests. With this setup, all the structure is preferably connected to the rotating part, and as consequence, it is rotating too. The camera could be placed at several angles and distances, only restricted by the machine structures;

Lighting (position and angle): The lighting system (such as front light 23 and back light 24) is also presented in FIG. 4. It could be composed by singular light sources, or continuous. Different angles and distances could be used, the present system allows to change it manually. Front low-angle illumination is preferably used. Depending on machine type, the light system could be used in different. Light sources on the same side of the camera (front light) are used to detect some defects (mainly shape flaws). Light sources on the opposite side of the camera (backlight) are used to detect other defects and properties (mainly structural flaws) and could be placed in several distances and angles. The present disclosure takes into account both approaches (simultaneously or not). Regarding light wavelength, the disclosed system is prepared to work with visible light spectrum as well as near-infrared light. Alternative wavelengths (such as UV or infrared) could be used as well, which are useful for detecting problems in coloured fabrics;

Optical system: Depending on the camera-textile distance, as well as the textile type (mainly on the density of yarns), an optical system must preferably be used in order to allow the camera to acquire a complete 2d signal without losing information. The present disclosure takes into account optical lenses that are preferably chosen for specific distances, and preferably guarantee imaging resolution of less than one millimeter, where for example for Lycra™ materials the defect may have 0.5 mm;

Variables for thresholding: There are several types of fabrics that could be produced: Jersey, Interlock, RIB, American fleece, etc. Each one has a different structure that needs to be considered in the disclosed system. For defect detection, the inspection software must preferably process the signal and check if all image parameters are acceptable. The threshold variables should preferably be different for different types of textiles. These variables are automatically controlled preferably by the system itself, by machine learning methods or simply by variance calculation and adjustment. of settings. Textile materials are not perfectly uniform because of its structure, hairiness and fibres. For that reason, uniformity analysis must preferably take into account uniformity error margins that could be dynamically changing or not;

Types of faults: Depending on the defect type, different algorithms will detect it. The present disclosure preferably follows a certain order to efficiently check the production quality. By computing Gaussian filters, Local Binary Pattern (LBP) algorithms, machine learning techniques and others, it is possible to identify patterns and non-uniformities on 2D signals. It follows that each defect is associated with a certain type of pattern or non-uniformity, and consequently it is possible to register each flaw individually.

FIG. 1 is a schematic conceptual representation of an embodiment of a circular (or Weft) knitting machine having a fixed support structure on top (that includes needles for knitting tubular fabric 1), a rotational support structure below the top that rotates (about an axis of rotation 25) with respect to the fixed support structure, and a system for controlling textile fabric defects according to the disclosure and fixed to lateral supports 4 of the rotational part of the machine. Here, the tubular fabric 1 rotates with the rotational support structure and further moves in direction 3 as part of the circular knitting process. In addition, three possible image acquisition zones 2 of the system (for signal acquisition of the fabric's width by cameras 5) are illustrated, corresponding to different portions of the flattening and rolling of the knitted tubular fabric 1 that takes place in the rotational support structure. The knitting machine further includes a roller (or rollers) 21 for flattening the circular knitted web 1 and directing the movement of the flattened textile fabric 18, a camera support structure 22 for holding the cameras 5, and a cylinder 19 for rolling-in the flattened textile fabric 18.

Figure 2:
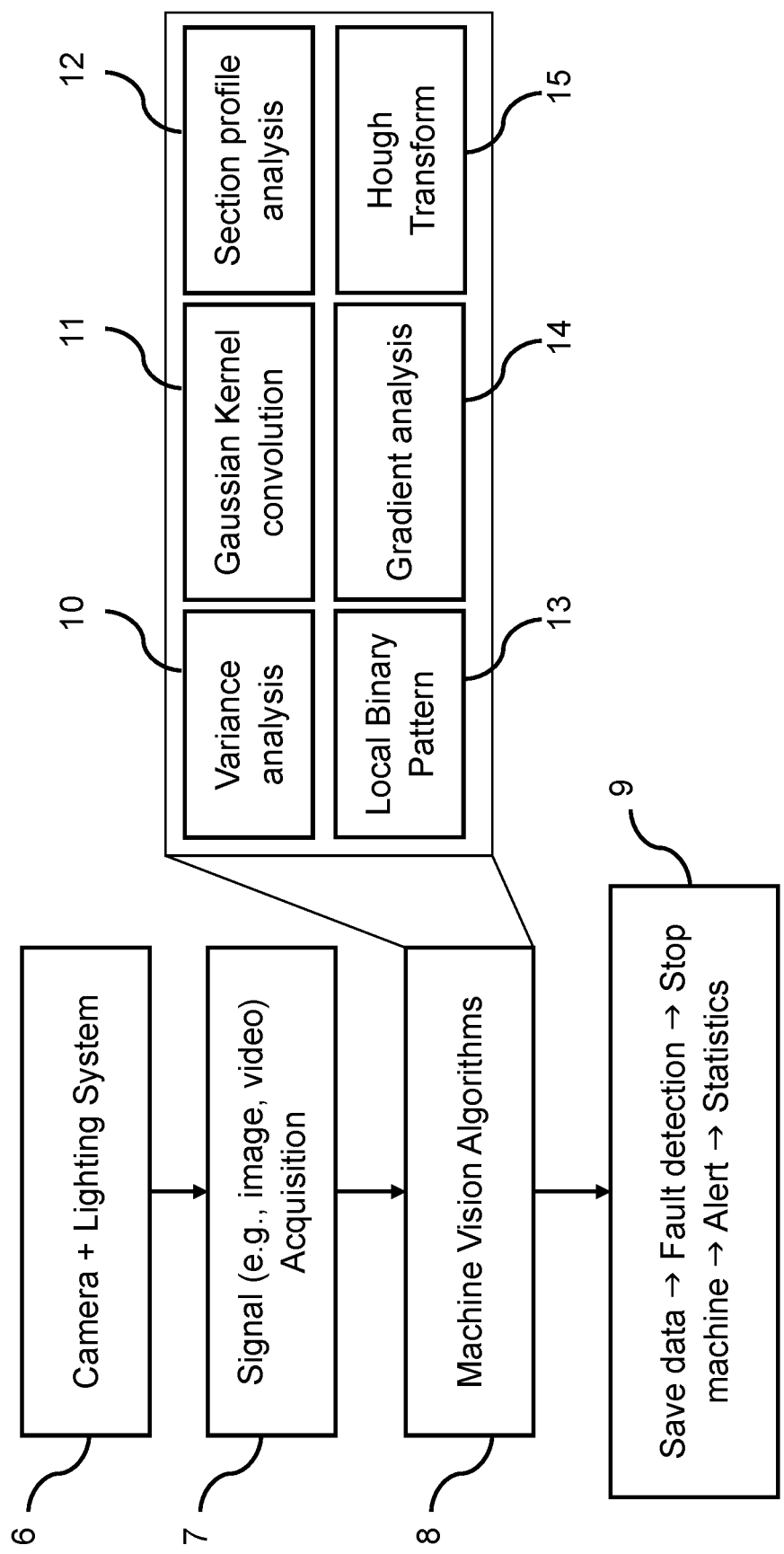
FIG. 2 is a block diagram of an embodiment of a data flowchart with a general view of the disclosed system.

FIG. 2 is a block diagram of an embodiment of a data flowchart with a general view of the disclosed system. Here, camera and lighting system 6 is used to acquire signals 7 (e.g., image signals, video signals) for processing by machine vision algorithms 8 on a processing unit. These algorithms 8 include, for example, one or more of variance analysis 10, Gaussian kernel convolution 11, section profile analysis 12, local binary pattern 13, gradient analysis 14, and Hough transform 15. Based on the results, the processing unit is further programmed to perform additional processing 9, such as saving the acquired signals and machine vision analysis, detecting faults in the textile fabric, stopping the knitting machine (e.g., after detecting the faults), alerting an operator of the knitting machine (e.g., after stopping the machine), and maintaining statistics of the number and type of faults detected.

Figure 3:
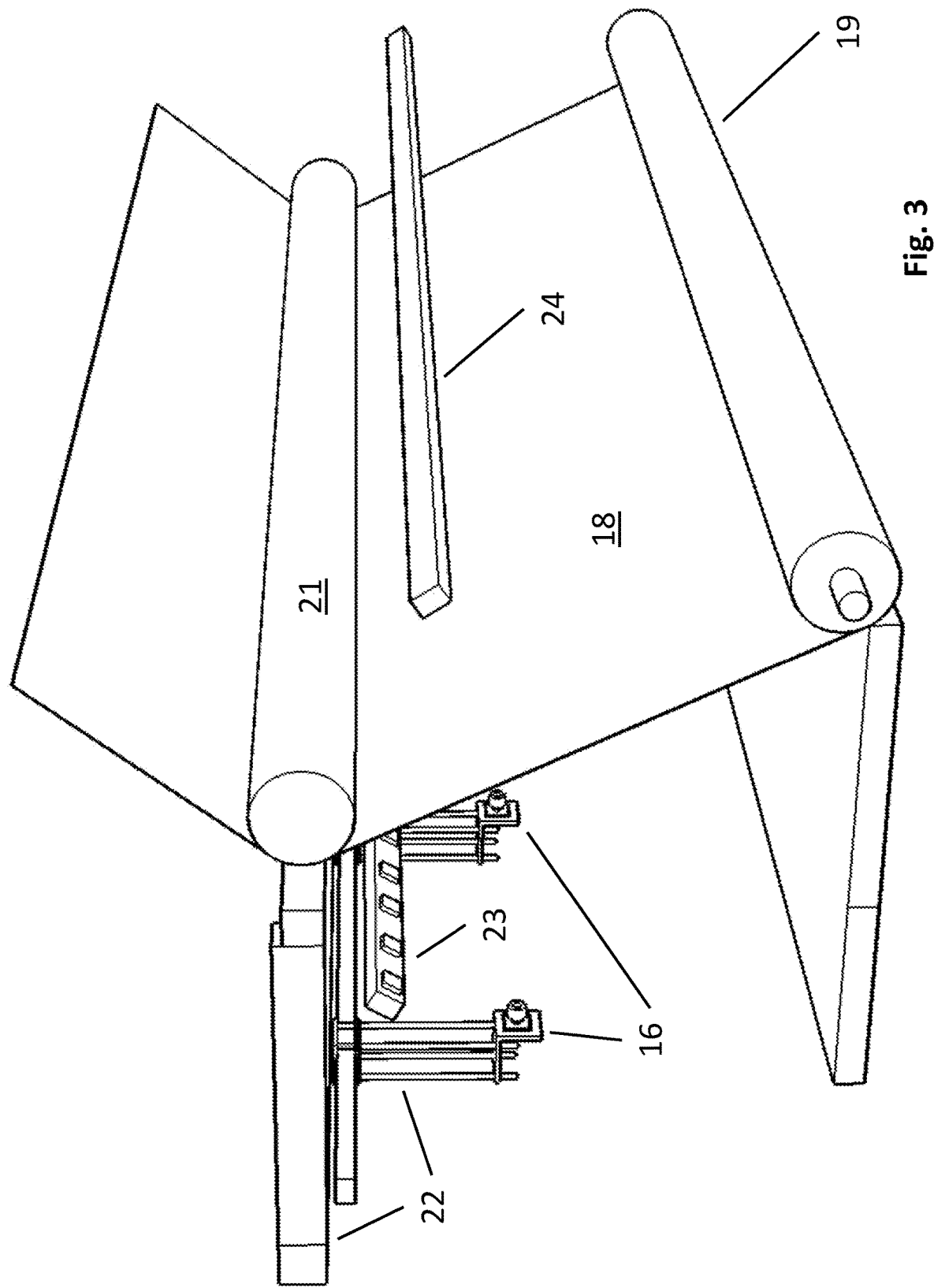
FIG. 3 is a schematic representation of the main elements of a main embodiment of a circular knitting machine with front and back lighting system.

FIG. 3 is a schematic representation of the main elements of a main embodiment of a circular knitting machine with front and back lighting systems 23 and 24. For the sake of conciseness, descriptions of similar elements (and that are identically numbered) to those of earlier drawings may not be repeated. To this end, FIG. 3 illustrates cameras 16 for imaging flattened textile fabric 18 using a front light 23 for illuminating the fabric from the camera side and a back light 24 for illuminating the fabric from the opposite side.

Figure 4:
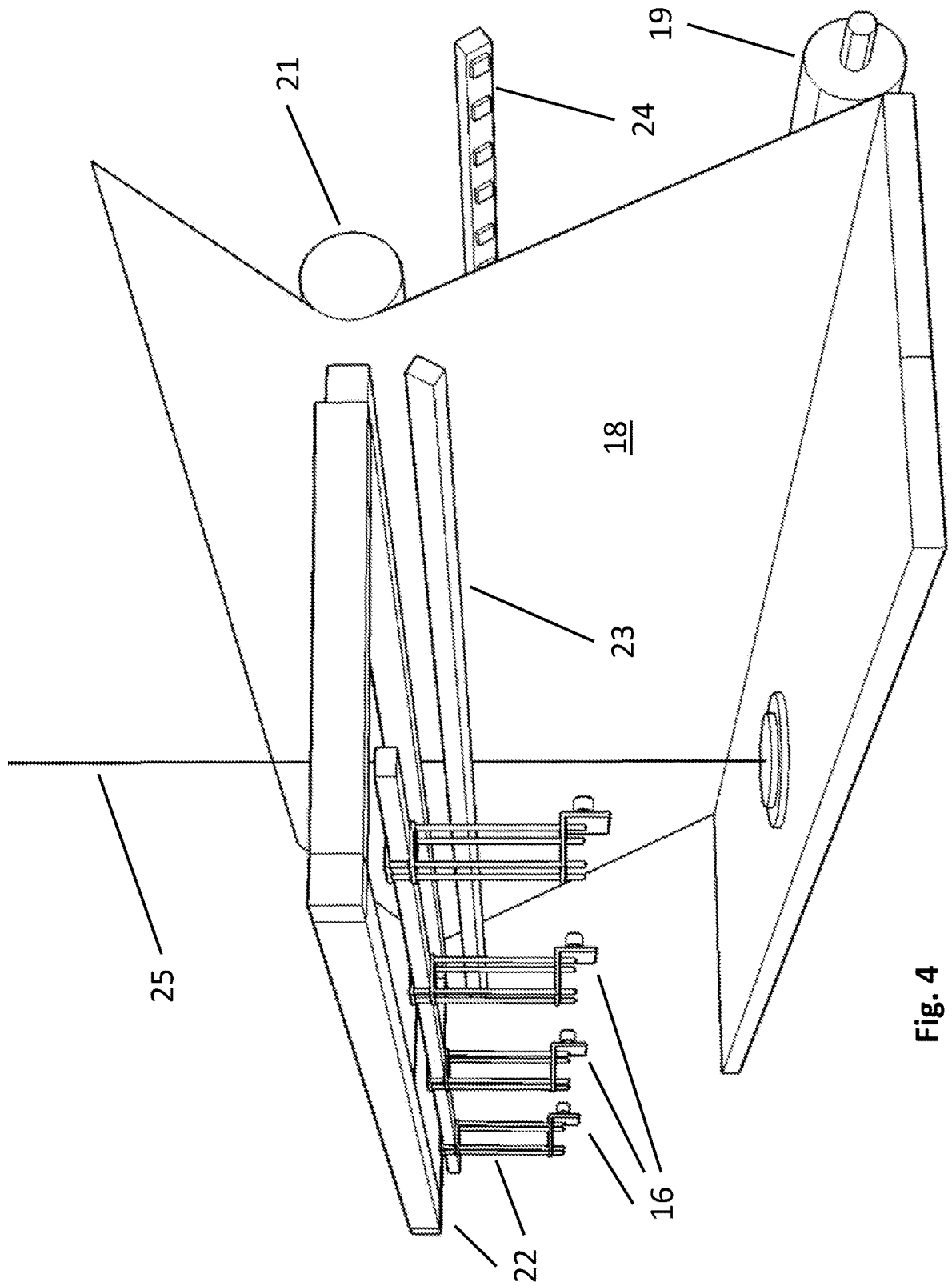
FIG. 4 is a schematic representation of the main elements of a main embodiment of a circular knitting machine with represented axis of rotation.
Figure 5:
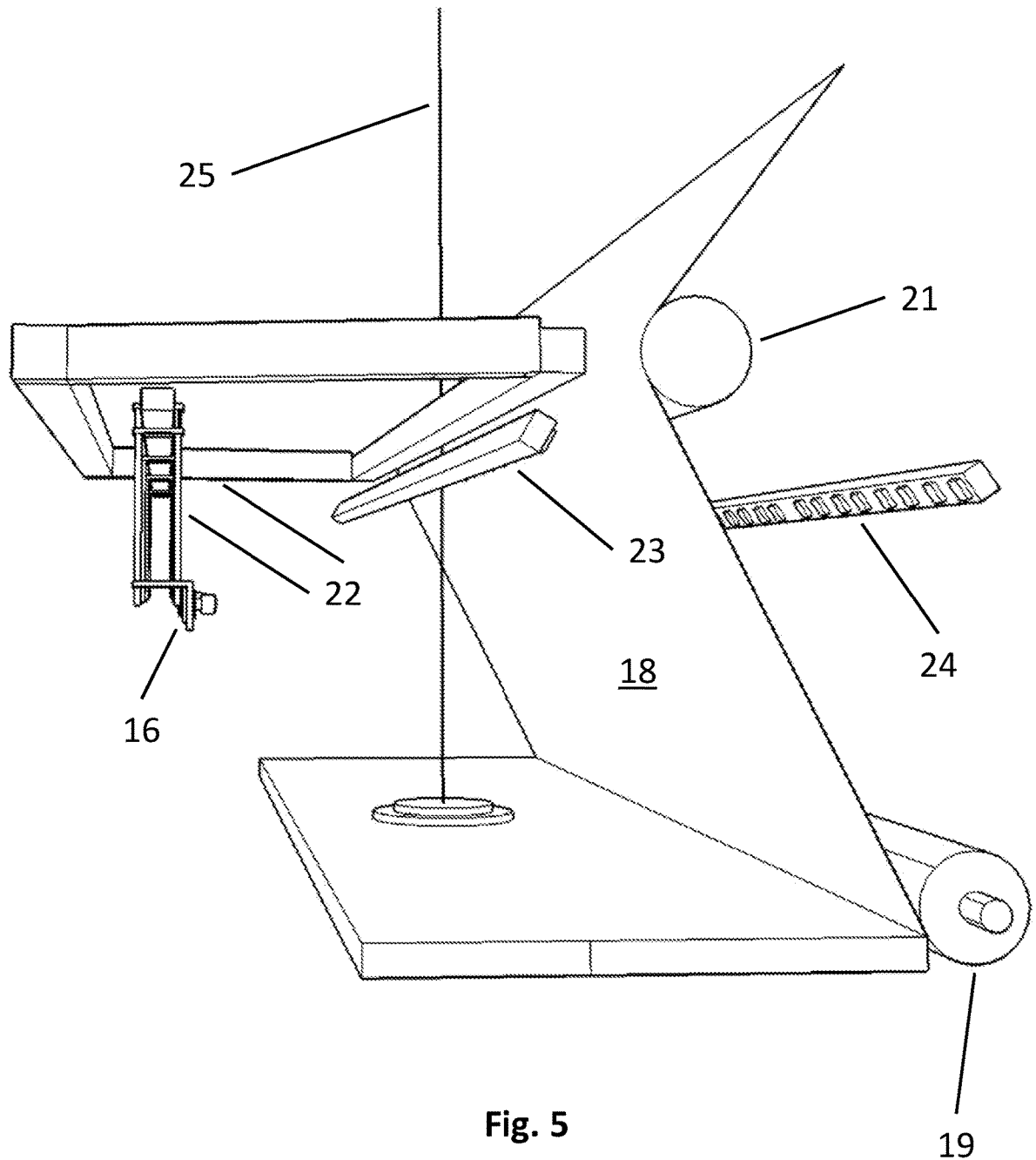
FIG. 5 is a schematic representation of the perspective view of main elements of a main embodiment of a circular knitting machine.
Figure 6:
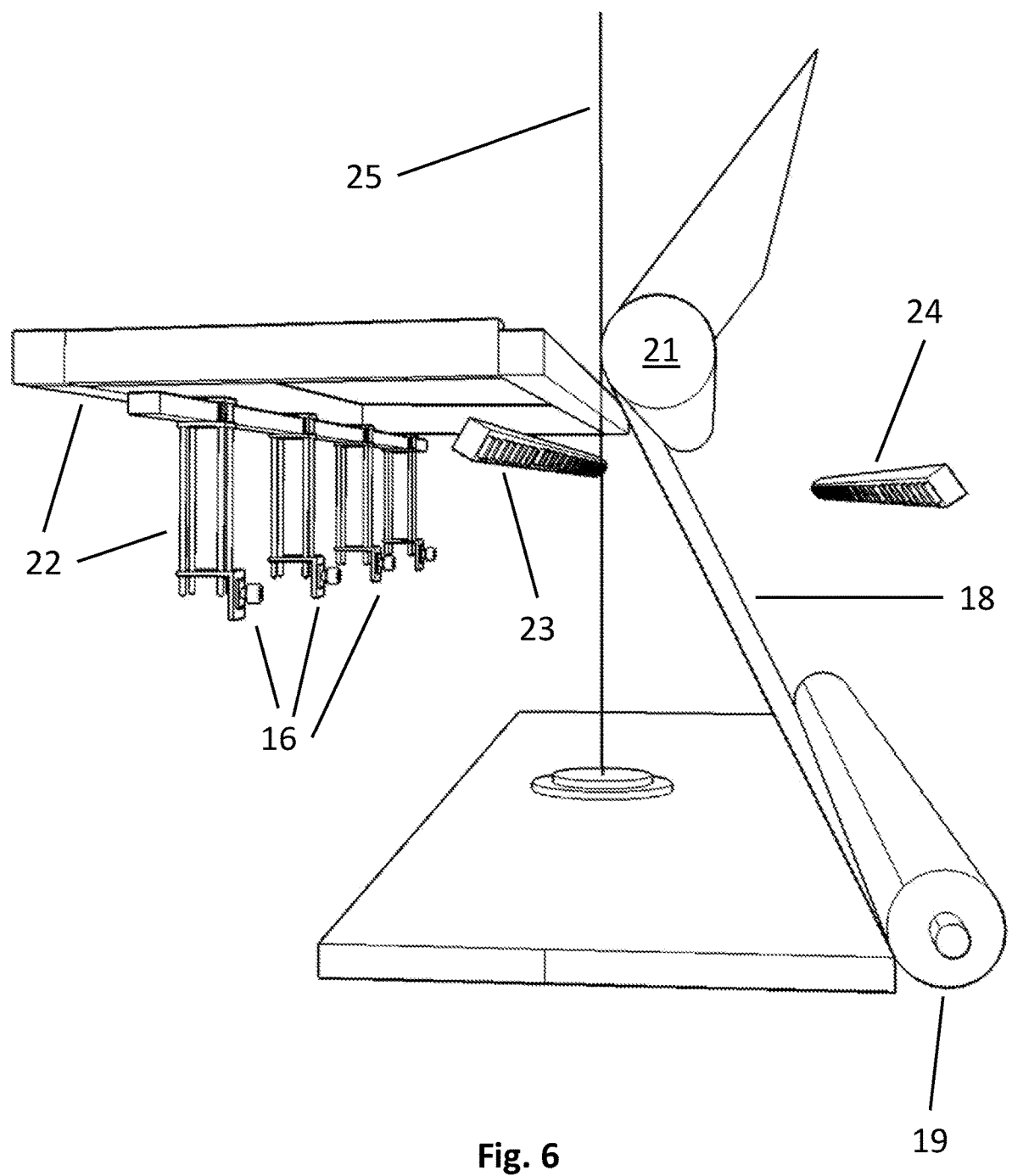
FIG. 6 is a schematic representation of another perspective view of main elements of a main embodiment of a circular knitting machine.

FIG. 4 is a schematic representation of the main elements of a main embodiment of a circular knitting machine with represented axis of rotation 25. FIG. 5 is a schematic representation of the perspective view of main elements of a main embodiment of a circular knitting machine, including camera support structure 22 holding the cameras 16. FIG. 6 is a schematic representation of another perspective view of main elements of a main embodiment of a circular knitting machine. FIGS. 4-6 illustrate the circular knitting machine of FIG. 3 from different perspectives.

Figure 7:
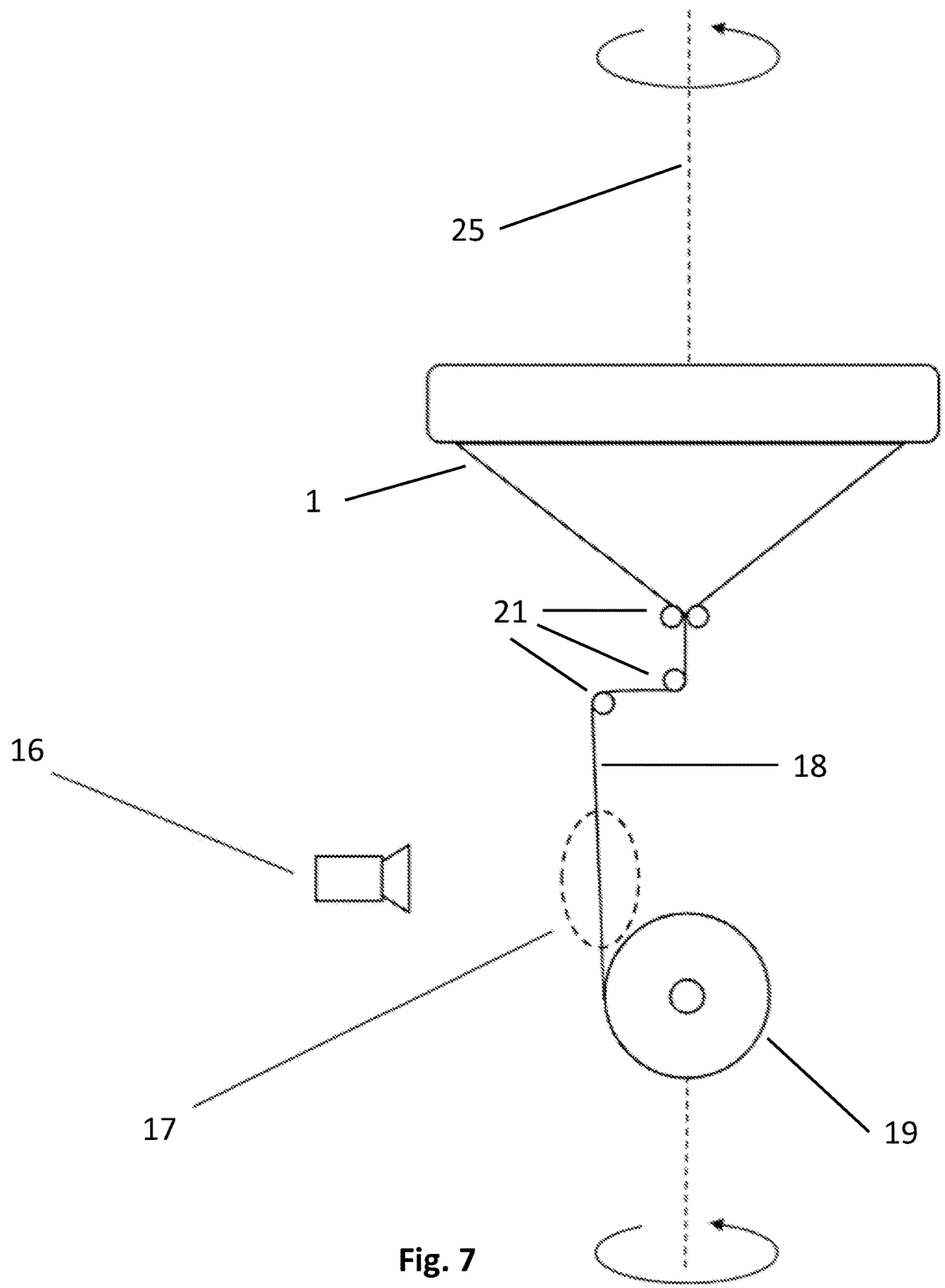
FIG. 7 is a schematic representation of the main elements of the rotative structure (tubular fabric being rolled) of an embodiment of a circular knitting machine.

FIG. 7 is a schematic representation of the main elements of the rotative structure (tubular fabric 1 being rolled into flattened textile fabric 18 by rollers 21) of an embodiment of a circular knitting machine. Here, detection zone 17 represents the portion of flattened textile fabric 18 being imaged by cameras 16 before being rolled onto cylinder 19.

Figure 8:
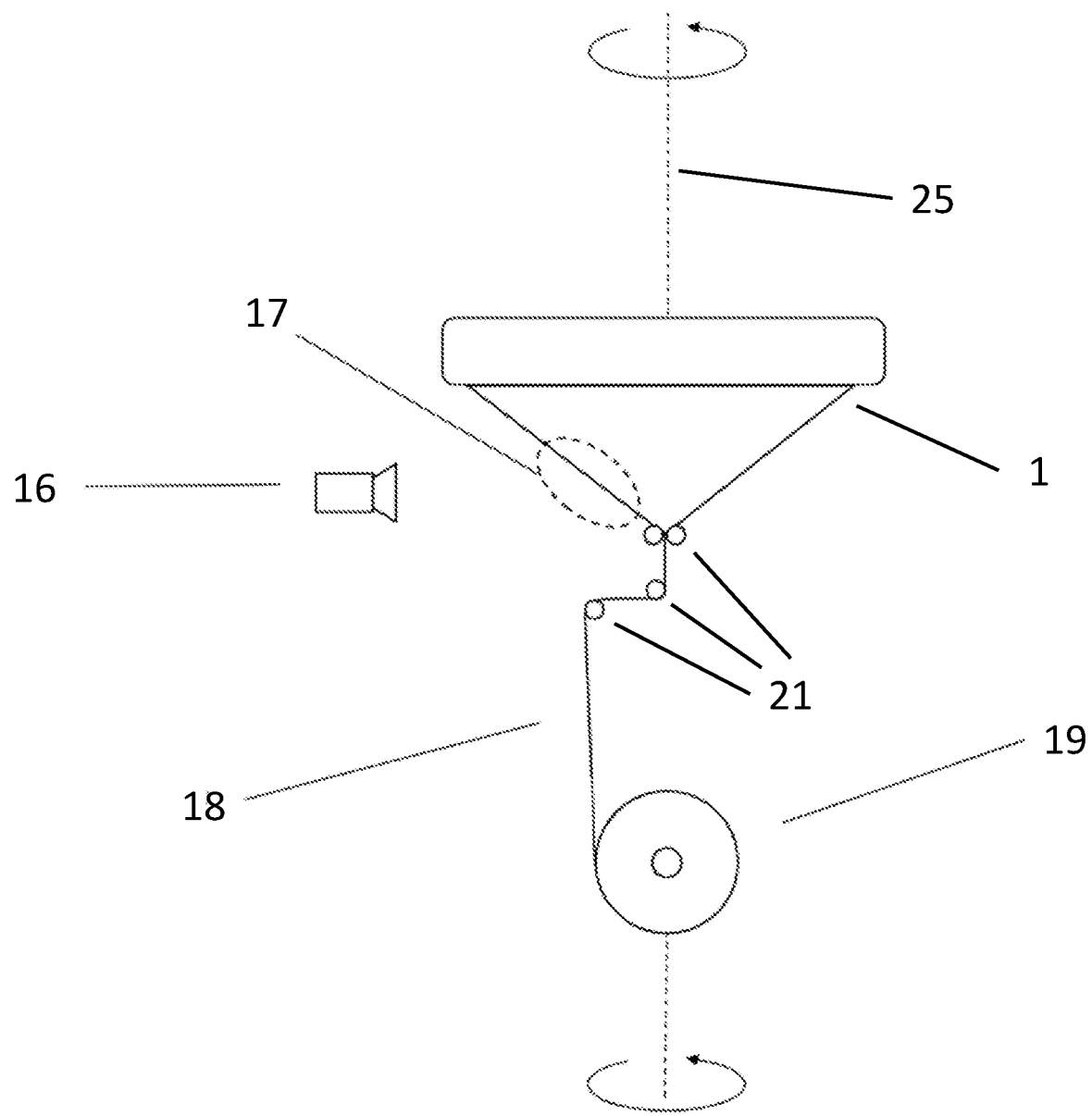
FIG. 8 is a schematic representation of the main elements of the rotative structure (tubular fabric being flattened) with alternative area to film according to an embodiment of a circular knitting machine.
Figure 9:
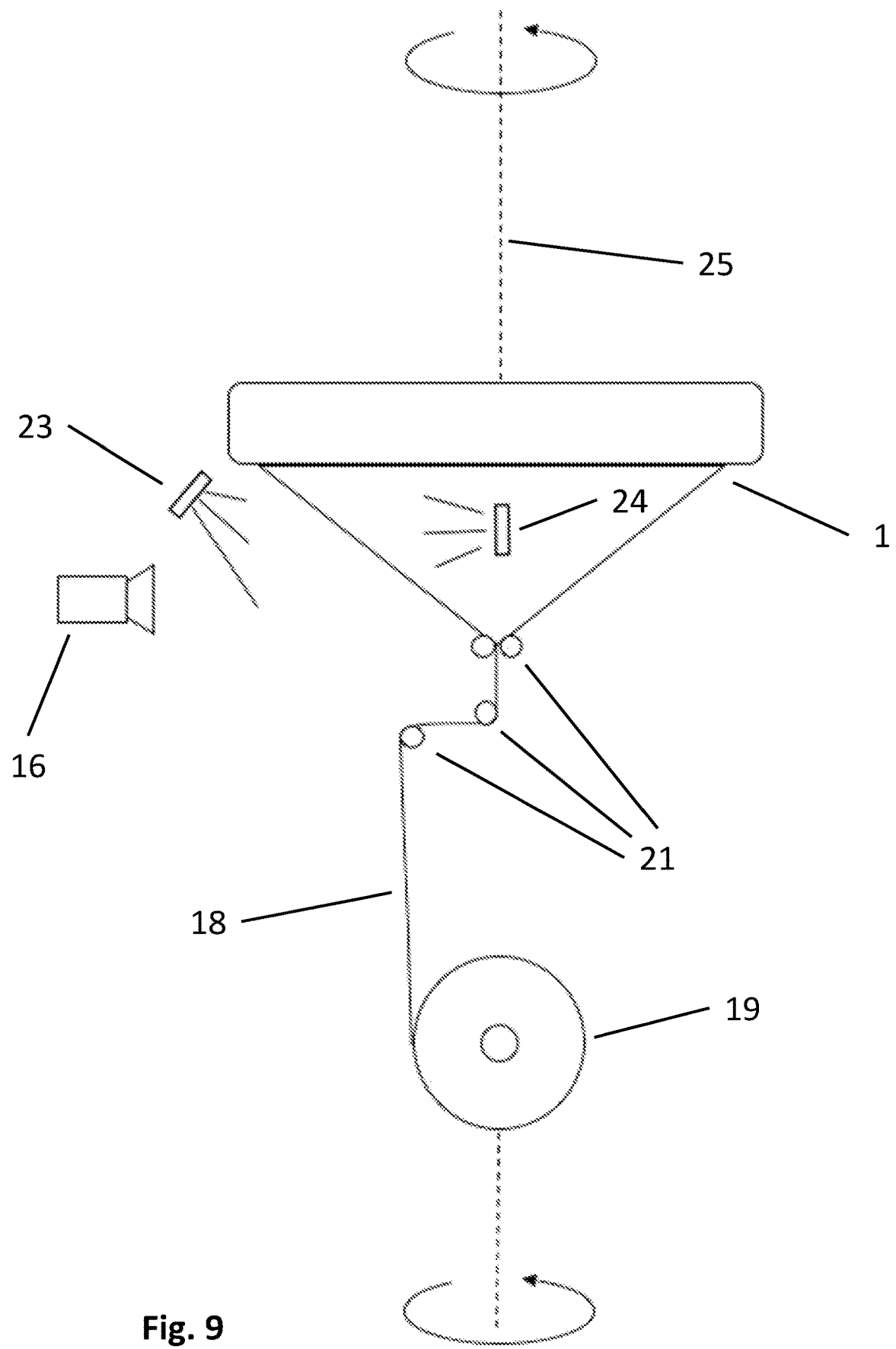
FIG. 9 is a schematic representation of the main elements of the rotative structure (tubular fabric being rolled) with alternative area to film according to an embodiment of a circular knitting machine.
Figure 10:
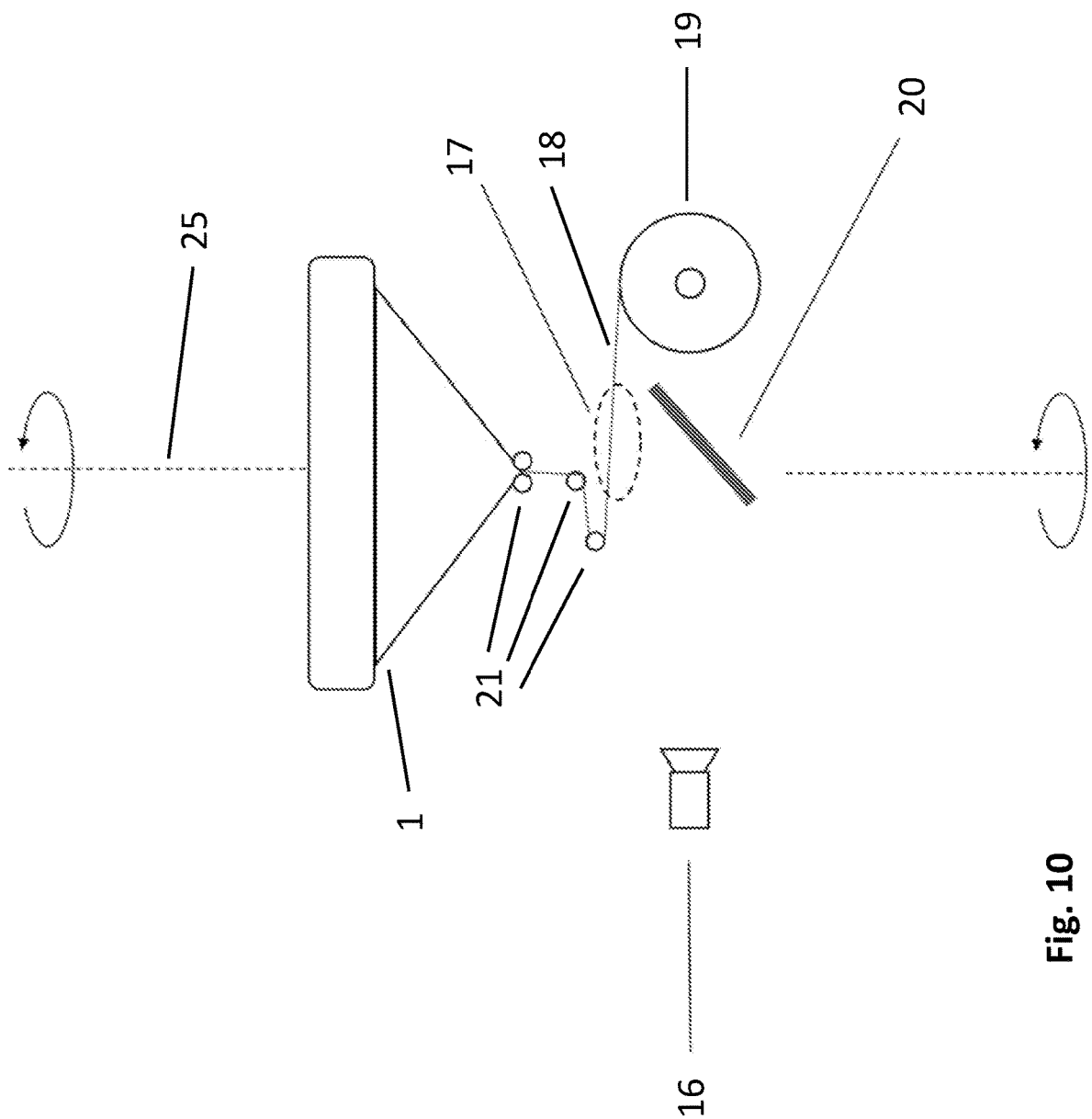
FIG. 10 is a schematic representation of the main elements of the rotative structure (tubular fabric being rolled) with alternative area to film according to an embodiment of a circular knitting machine using reflective systems, such as mirrors, to acquire images in difficult areas.

FIG. 8 is a schematic representation of the main elements of the rotative structure (tubular fabric 1 being flattened) with alternative area 17 to film (before flattening into flattened textile fabric 18) according to an embodiment. FIG. 9 is a schematic representation of the main elements of the rotative structure (tubular fabric 1 being rolled) with alternative area to film (before flattening) using front light 23 and back light 24 according to an embodiment. FIG. 10 is a schematic representation of the main elements of the rotative structure (tubular fabric 1 being rolled) with alternative area 17 (of flattened textile fabric 18) to film according to an embodiment using reflective systems, such as mirrors 20, to acquire images in difficult areas.

The present disclosure hardware is preferably responsible for: signal acquisition; controlled environment regarding lighting conditions; data communication between components (camera, processing unit, server, etc.); physical protection and mechanical supporting; and actuating on machinery by stopping it or activating an alert system, or both.

Regarding software, it is preferably responsible for: processing and analysing acquired data (images, light sources, machine status); controlling the communication between components; controlling hardware for actuating on machinery; and data analysis for statistics and reporting.

There are alternative ways of using the disclosed system and method, such as: (1) using multiple cameras for image acquisition on full textile width. This could be done by supporting multiple cameras on the structure placed in the rotative part of the knitting machine. One example of this approach is depicted in FIGS. 1, 3, 4, 5 and 6; (2) using linear cameras (1D signal) synchronized with the textile movement in order to build a 2d signal. This alternative will lead to a 2d signal (image or image sequences) as the disclosure suggests; (3) integrating it in several positions such as the cylinder, doors, fixed structure on the bottom of the machine, etc. All alternatives have in common the use of image acquisition for defect detection and automatic quality control of knitted fabrics in real time; (4) integrating this system in other machines such as different circular knitting machinery (different brands or models), inspection machinery or dye-house machinery; (5) using 2d signal acquisition and processing for automatic quality control of knitted fabrics in real time; (6) using alternative methods for communication between elements, including acquired data from the camera to the processing unit (wireless or not). Communication from the acquisition element to exterior could also be done using different wireless communication systems; (7) using light sources with a front light arranged on said frontal support structure to illuminate the knitted textile fabric from the camera side for capture by the digital camera, and a back light arranged on said back support structure to illuminate the knitted textile fabric, from a side of the textile fabric opposite to the camera, for capture by the digital camera; wherein the frontal and back support structures are fixed to the rotational structure; (8) using alternative illumination systems. Changing the light angle, the number of light sources, or the distance to fabrics, will lead to different image properties. However, the disclosed system is prepared to work properly with different light, adjust its variables for several lighting conditions. The acquisition module could use alternative wavelengths such as infrared, ultraviolet, or specific visible light (front light as well as backlight); (9) using additional structures and systems to perform signal acquisition, such as when the rotative part of the knitting machine does not allow to place the structures described before. If there is no space for camera positioning, it is possible to use reflection systems, such as mirrors, to give flexibility to the disclosed system. This is particularly useful for situations where the textile fabrics do not allow to place cameras in a perpendicular angle. An example is depicted in FIG. 10.

The term "comprising" whenever used in this document is intended to indicate the presence of stated features, integers, steps, components, but not to preclude the presence or addition of one or more other features, integers, steps, components or groups thereof. The disclosure should not be seen in any way restricted to the embodiments described and a person with ordinary skill in the art will foresee many possibilities to modifications thereof. The above-described embodiments are combinable. The following claims further set out particular embodiments of the disclosure.

The invention claimed is:

1. A circular knitting machine having a fixed support structure, a rotational support structure that rotates with respect to the fixed support structure, and a system for controlling textile fabric defects, said circular knitting machine comprising:
    a roller for flattening a circular knitted web into said textile fabric; and
    a cylinder arranged on a lower part of said rotational support structure for rolling-in the flattened textile fabric,
    said system comprising
        a digital camera for capturing digital images of the knitted textile fabric,
        a data processor for processing the captured digital images, and
        a camera support structure for holding the camera,
    wherein the camera support structure is fixed to and rotates, together with the held camera, with the rotational support structure.

2. The circular knitting machine according to claim 1, wherein said camera support structure is arranged such that the digital camera captures digital images of the flattened textile fabric.

3. The circular knitting machine according to claim 1, wherein the data processor is arranged for processing the captured digital images for detecting textile defects in real time, for stopping the motion of the circular knitting machine for preventing more defects.

4. The circular knitting machine according to claim 1, wherein said digital camera is a one-dimensional camera or a 2D camera.

5. The circular knitting machine according to claim 1, wherein said camera support structure comprises a front light for illuminating the knitted textile fabric from the camera side.

6. The circular knitting machine according to claim 1, further comprising an additional support structure and a back light arranged on said additional support structure for illuminating the knitted textile fabric from a side opposite the camera side and fixed to the rotational support structure, wherein said back light comprises a light source for illuminating the knitted textile fabric.

7. The circular knitting machine according to claim 1, wherein said circular knitting machine further comprises: a front light arranged on said camera support structure to illuminate the knitted textile fabric from the camera side for capture by the digital camera; an additional support structure; and a back light arranged on said additional support structure to illuminate the knitted textile fabric from a side of the textile fabric opposite to the camera side for capture by the digital camera, wherein the camera support structure and the additional support structure are fixed to the rotational support structure.

8. The circular knitting machine according to claim 1, wherein the camera is arranged to accommodate an optical device for enhancing resolution of the images captured from the knitted textile fabric.

9. The circular knitting machine according to claim 8, wherein the optical device comprises one or more optical lenses arranged for signal acquisition.

10. The circular knitting machine according to claim 9, wherein the optical lenses are selected for predetermined distances for obtaining an imaging resolution of less than one millimetre.

11. The circular knitting machine according to claim 6, wherein said camera support structure comprises a front light comprising a light source for illuminating the knitted textile fabric from the camera side, and wherein the front light and back light sources comprise light sources with different wavelengths selected from the group consisting of: infrared light, visible light, ultraviolet light, and combinations thereof.

12. A method for retrofitting a circular knitting machine having a fixed support structure and a rotational support structure that rotates with respect to the fixed support structure, with a system for controlling textile fabric defects, the method comprising:
    fitting said circular knitting machine with the system to obtain the retrofitted circular knitting machine, wherein said circular knitting machine comprises
    a roller for flattening a circular knitted web into said textile fabric, and
    a cylinder arranged on a lower part of said rotational support structure for rolling-in the flattened textile fabric,
    wherein said system comprises
        a digital camera for capturing digital images of the knitted textile fabric,
        a data processor for processing the captured digital images, and
        a camera support structure for holding the camera, and
    wherein the camera support structure is fixed to and rotates, together with the held camera, with the rotational support structure.

13. A method for controlling textile fabric defects of a circular knitting machine having a fixed support structure, a rotational support structure that rotates with respect to the fixed support structure, and a system for controlling the textile fabric defects, said circular knitting machine comprising:
    a roller for flattening a circular knitted web into said textile fabric, and
    a cylinder arranged on a lower part of said rotational support structure for rolling-in the flattened textile fabric,
    said system comprising
        a digital camera for capturing digital images of the knitted textile fabric, a data processor for processing the captured digital images, and a camera support structure for holding the camera, wherein the camera support structure is fixed to and rotates, together with the held camera, with the rotational support structure, and wherein the method comprises:

capturing the digital images of the knitted textile fabric using the rotating camera; and using the data processor for processing the captured digital images for detecting knitted textile fabric defects.

14. The method for controlling textile fabric defects of the circular knitting machine according to claim 13, wherein said camera support structure is arranged such that the digital camera captures digital images of the flattened textile fabric.

15. The method according to claim 13, wherein capturing the digital images of the knitted textile fabric is made between the roller and the cylinder with the digital camera.

16. The method according to claim 13, wherein capturing the digital images of the knitted textile fabric is made in rotational synchronisation between the camera and the knitted textile fabric.

17. The method according to claim 13, wherein the method further comprises using a front light to illuminate the knitted textile fabric from the camera side for capture by the digital camera, and using a back light to illuminate the knitted textile fabric from the side opposite to the camera side for capture by the digital camera.

18. The method according to claim 13, further comprising using the data processor for processing the captured digital images in real time for detecting textile defects.

* * * * *